(12) United States Patent　(10) Patent No.: US 6,318,899 B1
Boyd　(45) Date of Patent: Nov. 20, 2001

(54) NON-LUBRICATED ROLLING ELEMENT BALL BEARING

(75) Inventor: Gary Lewis Boyd, Durango, CO (US)

(73) Assignee: Ceramic Engineering Consulting, Inc., Durango, CO (US)

( * ) Notice: Subject to any disclaimer, the term of this patent is extended or adjusted under 35 U.S.C. 154(b) by 0 days.

(21) Appl. No.: 09/460,470

(22) Filed: Dec. 14, 1999

Related U.S. Application Data

(60) Provisional application No. 60/112,084, filed on Dec. 14, 1998.

(51) Int. Cl.[7] ............................. F16C 33/32; F16C 19/06
(52) U.S. Cl. ............................. 384/492; 384/513
(58) Field of Search .................... 384/492, 499, 384/506, 505, 513, 514, 516

(56) References Cited

U.S. PATENT DOCUMENTS

| | | | | |
|---|---|---|---|---|
| 1,093,348 | * | 4/1914 | Mooers | 384/506 |
| 2,142,477 | * | 1/1939 | Murden | 384/516 |
| 2,232,159 | * | 2/1941 | Blood | 384/513 |
| 2,316,449 | * | 4/1943 | Parker | 384/516 |
| 2,325,623 | * | 8/1943 | Murtagh et al. | 384/516 |
| 3,097,897 | * | 7/1963 | Taylor | 384/492 |
| 3,370,899 | * | 2/1968 | Eklund | 384/516 |
| 3,647,268 | * | 3/1972 | Haines | 384/516 |
| 4,565,457 | * | 1/1986 | Flander | 384/450 |
| 4,963,040 | | 10/1990 | Takebayashi et al. . | |
| 4,966,552 | * | 10/1990 | Gonser | 384/492 X |
| 4,968,158 | * | 11/1990 | Atkinson et al. | 385/535 |
| 5,083,884 | | 1/1992 | Miller et al. . | |
| 5,139,396 | | 8/1992 | Suzuki et al. . | |
| 5,228,786 | | 7/1993 | Tanimoto et al. . | |
| 5,741,762 | * | 4/1998 | Kahlman | 384/492 X |
| 6,113,277 | * | 9/2000 | Lindrose et al. | 384/513 |

* cited by examiner

*Primary Examiner*—Thomas R. Hannon
(74) *Attorney, Agent, or Firm*—Holland & Knight LLP

(57) ABSTRACT

An all-ceramic rolling element ball bearing assembly utilizes the superior compressive strength and hardness of ceramic materials over bearing steels to provide a point contact load bearing interface between the bearing balls and races that has no relative motion in the ball/race contact zone. Without the frictional heating of a curved-line contact bearing design, the all-ceramic bearing does not require the use of a friction reducing lubricant.

10 Claims, 2 Drawing Sheets

NON-LUBRICATED ROLLING ELEMENT BALL BEARING

SPECIFIC DATA RELATED TO APPLICATION

This application is a continuation-in-part of U.S. provisional application, Ser. No. 60/112,084, filed Dec. 14, 1998.

TECHNICAL FIELD

The present invention is in the field of rolling element ball bearings. Particularly, the present invention is directed to all-ceramic rolling element ball bearings that require no lubrication.

BACKGROUND OF THE INVENTION

A long recognized need in rolling element ball bearing applications is a bearing that requires no lubrication, can operate at elevated temperatures, is lightweight and, has the ability to operate in a corrosive environment. All metal rolling element ball bearings require some form of lubrication due to the relative motion that is inherent between the balls and the balls raceways (inner and outer races). The relative motion is the result of two radii of different dimensions operating in contact with each other. The ball has a slightly smaller radius than the raceways thereby creating a line-contact arc curve region. The center point of the line-contact arc curve receives the greatest radial load between the ball and the raceways and has no relative motion during bearing operation. However, all points along the line-contact arc curve away from the center point are sliding with respect to the center point of the curve. The design intent of the line-contact arc curve is to displace the bearing loads imposed on the bearing members over an arc length sufficient to prevent permanent damage to the metallic bearing components. This life limitation can be in the form of brinelling (or indenting) of the metallic bearing surfaces, low cycle metal fatigue, or simply frictional wear of the bearing surfaces. Bearing life is extended through prudent design of the line-contact arc curve interface between the balls and the raceways such that the metallic material properties are not exceeded in normal bearing operation. In addition, lubricating fluids (oil, grease, or solid film lubricants) are used in the bearings to lower the friction between the balls and the races thereby extending bearing fatigue and wear life while reducing the bearing drive torque requirement.

Rolling element ball bearings containing metallic components (balls or raceways) are also limited to relatively low operating temperatures. In part, the temperature limitations are due to the degradation in strength of the metallic bearing steels with elevated temperature but also, temperature limitations are imposed because of the operating temperature limitations of the bearing lubricant. The use of dry film lubricants in place of oils and greases is an attempt to increase the operating temperature capability of some bearings without lubricating oil or grease temperature restrictions while minimizing the complexity of the lubrication system.

State-of-the art ceramic balls are being used in hybrid bearings (ceramic balls/metallic raceways) due to the lower dynamic friction coefficient between the ceramic balls and the metallic races versus that of metallic balls to metallic races. The high Young's Modulus and low density of ceramic balls also helps reduce ball deformation during high speed bearing operation for the former, and reduces ball skidding and outer race stresses for the latter. The weak link in hybrid bearings is still the metallic raceways due to metallic material limitations (i.e., compressive strength and hardness). Additionally, the contact region between the ceramic balls and metallic raceways still requires a line-contact arc curve and hence the requirement for some form of lubricant. The hybrid bearing lubrication requirements are less than those of an all-metallic bearing but nonetheless are required (in some amount) for normal bearing operation.

While most all-metallic bearings utilize the line-contact arc curve interface design, some metallic bearings utilize a concept known as a four-point contact bearing configuration. This concept creates point-contact between the ball and the raceway via a curved ball outer surface against a flat (or conical) raceway surface and therefore does not adequately distribute the imposed bearing loads along the contact surface of the metallic raceways. These point-contact (hertzian) loads result in very short bearing life and very low bearing load capacity and are generally used as stop-gap bearings only. Bearing steels have a relatively low compressive strength and hardness and will brinell quickly in point-load contact. The bearing surface of the balls and the raceways in a four-point contact bearing quickly degrade as brinelling occurs increasing interfacial friction and causing micro-welding and material pull-out between the metallic bearing components. The point contact zone immediately degrades to a relatively rough line-contact arc curve as the bearing surfaces rapidly degrade to failure. Continued bearing operation under these conditions always results in catastrophic bearing failure. The best metallic materials therefore will not support point load contact due to insufficient compressive strength and material hardness.

SUMMARY OF THE INVENTION

In view of the deficiencies of the conventional all-metallic and hybrid ceramic/metallic rolling element ball bearings as a result of the metallic material property limitations of compressive strength and hardness, it is the primary object of this invention to provide a unique bearing design with ceramic materials capable of being operated in a four-point (hertzian) contact configuration for extended periods of bearing life without the need for any type of lubricating medium for use between the balls and the raceways.

Accordingly, the present invention provides a ceramic/ceramic bearing structure in which both the balls and the bearing races are designed and fabricated from a state-of-the-art ceramic material such as a silicon nitride ($Si_3N_4$), Alumina ($Al_2O_3$), Zirconia (ZrO), etc. The bearing is designed such that the inner diameter of the bearing inner race is fabricated from a candidate state-of-the art ceramic material which circumscribes (or is otherwise attached to) a metallic rotating shaft member and is anti-rotated and axially and radially positioned via an interference fit, braze joint, coupling, or coupled shaft segment. Said inner race may be split (or monolithic) radially along its axial length such that ceramic balls and a ball separator (ball set) can be installed. The ceramic ball(s) set then engages one half of the ceramic inner race and contacts a single-piece (monolithic or radially split) outer ceramic race. The inner and outer races may have inwardly V-shaped (or conical) surfaces such that the open end of the V-shape on both races (inner and outer) are facing the ceramic balls. Another means of achieving the desired point contact between the ceramic ball and the ceramic raceways is by having the ceramic balls contact the open end of a radius in the raceways. When the second half (or monolith) of the inner (and/or outer race) is installed, the all-ceramic bearing assembly is complete and the ceramic balls are contacting the inner and outer races at 4 points (or 3 points when an axial bearing pre-load is applied). Some dimensional tolerances may be applied to allow for thermal expansion of the bearing elements with respect to themselves and the adjacent shaft and structures. A means of dynamically isolating the bearing may also be applied between the outer race O.D. and the stationary structure in which it is mounted, (i.e., hydraulic mount, spring mount, resilient mount, etc.). Axially pre-loading the bearing such that the ceramic ball is driven through one (point contact location) side of inner race can be achieved through the use of axial springs.

An advantage of the present invention is that it provides a rolling element ball bearing that does not require lubrication between the ceramic ball and the ceramic raceways, vastly simplifying the bearing design and equipment design in which the bearing is installed. A further advantage of the present invention is that the all-ceramic bearing can operate to significantly higher temperatures than conventional all-metallic or hybrid ceramic/metallic rolling element ball bearings providing a strategic advantage in applications requiring elevated temperature operation. An additional advantage of the present invention is the ceramic material's capability to operate in most corrosive environments without ceramic ball or race material degradation. Still another advantage of the present invention is the reduction in the total weight of the bearing assembly over that of either an all-metallic or hybrid ceramic/metallic bearing for applications that are weight sensitive (i.e., missiles, aircraft, drones, spacecraft, dental drills, etc.). Finally, another advantage of the present invention is the extremely low torque requirement of the all-ceramic rolling element ball bearing.

The all-ceramic four (4) point contact rolling element ball bearing provides rotating shaft to stationary housing alignment, low bearing drive torque, no lubrication system requirement, dynamic rotor damping via the outer race mount structure, superior bearing stiffness and adequate load capacity for most bearing applications.

BRIEF DESCRIPTION OF THE DRAWINGS

For a better understanding of the present invention, reference may be had to the following detailed description taking in conjunction with the accompanying drawings in which.

DETAILED DESCRIPTION OF THE INVENTION

Figure 1:
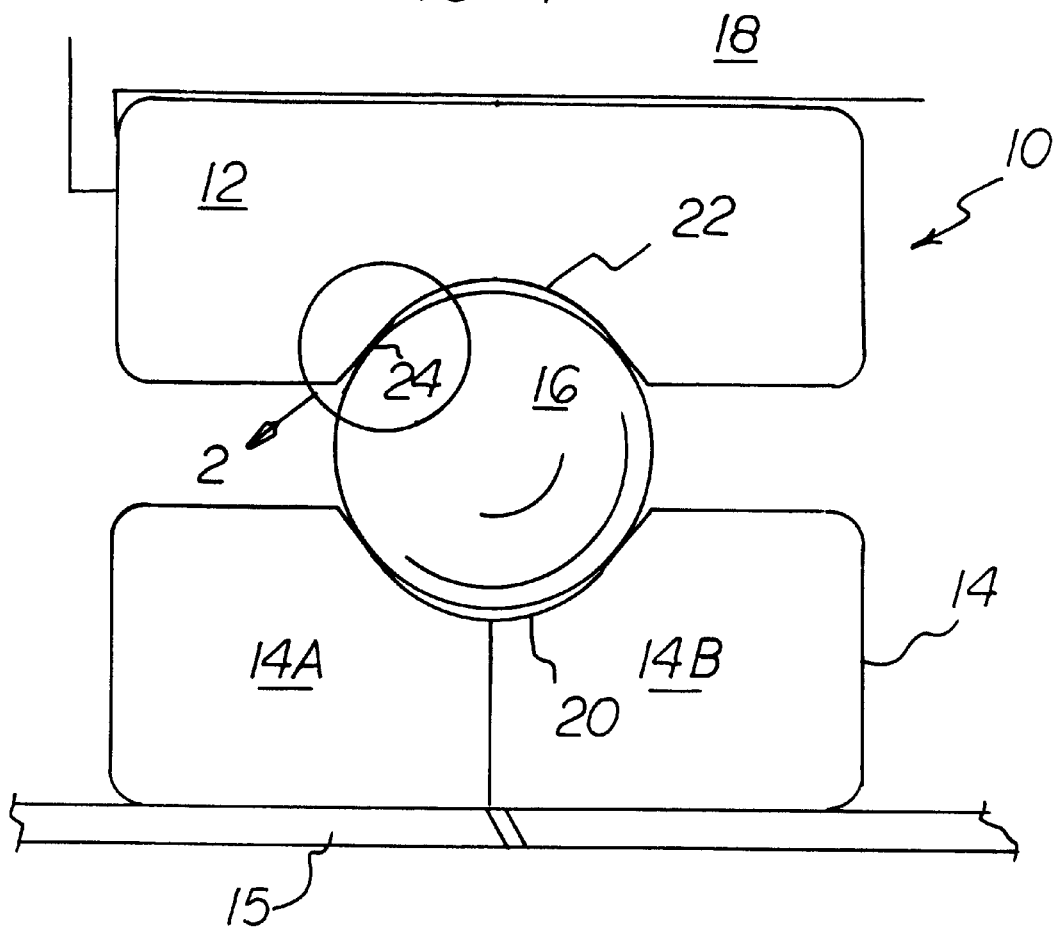
FIG. 1 is a cross-sectional view of a bearing assembly in accordance with one form of the present invention.
Figure 2:
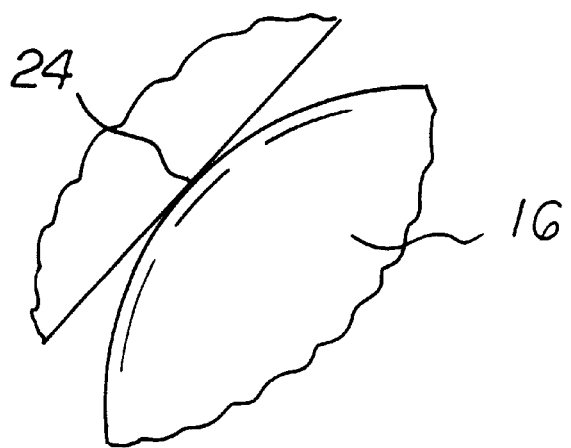
FIG. 2 is an enlarged view of the area at A of FIG. 1 showing point contact between a ball bearing and race.

Referring to the drawings in general and in particular to FIG. 1, an all ceramic, high temperature, non-lubricated ball bearing assembly 10 in accordance with one form of the invention includes an outer ceramic race 12, an inner ceramic race 14 and a plurality of ceramic ball bearings such as bearing 16. The outer race 12 is supported by an outer metallic race housing 18. The inner race 14 may be mounted on a shaft 15 or other rotating structure using conventional techniques such as, for example, interference fit, mechanical couplings, brazing or adhesive bonding. Each of the inner and outer races 12, 14 include a bearing receiving groove 20, 22, respectively. The bearing 16 seats in the grooves 20, 22 and the respective dimensions of the bearing and grooves are selected such that the bearing makes point contact at no more than two points in each groove. FIG. 1 illustrates the races having grooves with a depth less than one-half a diameter of each ball bearing. The grooves 20, 22 may be shaped as arcuate segments with a circular cross-section having a greater radius than the radius of the ball bearing 16 or may be V-shaped or conical. FIG. 2 shows an enlarged view of a contact point 24 in area A to illustrate how the smaller radius bearing 16 contacts the surface of the larger radius groove 20. Both the ball bearings and the inner and outer races are completely formed from a ceramic material. Suitable ceramic materials include silicon nitride, alumina, and zirconia.

FIG. 1 also illustrates a split inner race 14 formed of two sections 14A and 14B. In a cylindrical embodiment of the invention such as suggested by reference to mounting of the inner race on a shaft, the split race may simplify assembly and allow adjustment and pre-loading of the bearing assembly. Although not shown, it will be recognized that either or both of the inner and outer race may be formed with such split construction.

Figure 3:
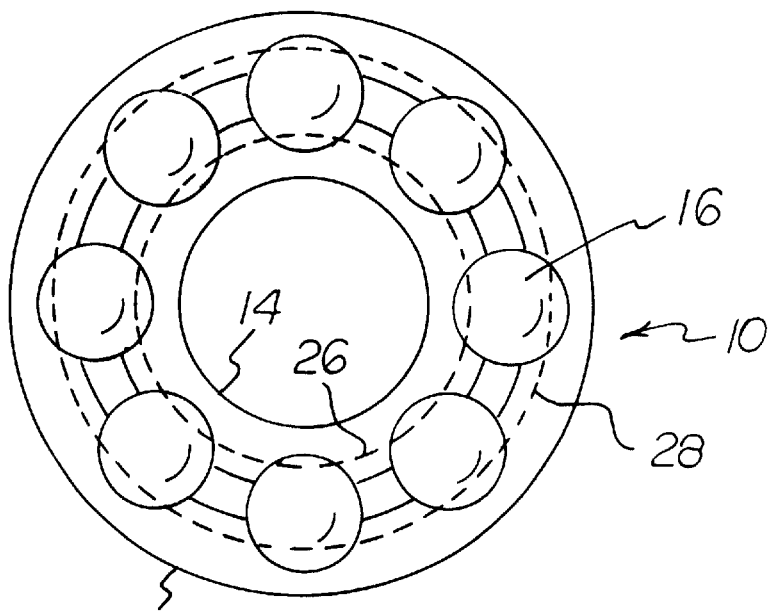
FIG. 3 illustrates a bearing assembly in one form of the invention with point contact diameters shown in phantom.

FIG. 3 is an assembly view of one form of the bearing assembly in which a plurality of ceramic ball bearings 16 are uniformly circumferentially distributed about the cylindrical bearing assembly 10. The bearings 16 are separated by conventional spacers (not shown). The phantom lines at 26, 28 represent the point contact diameters in the inner and outer races 14, 12. This embodiment also illustrates the inner and outer races as closed cylindrical races.

Figure 4:
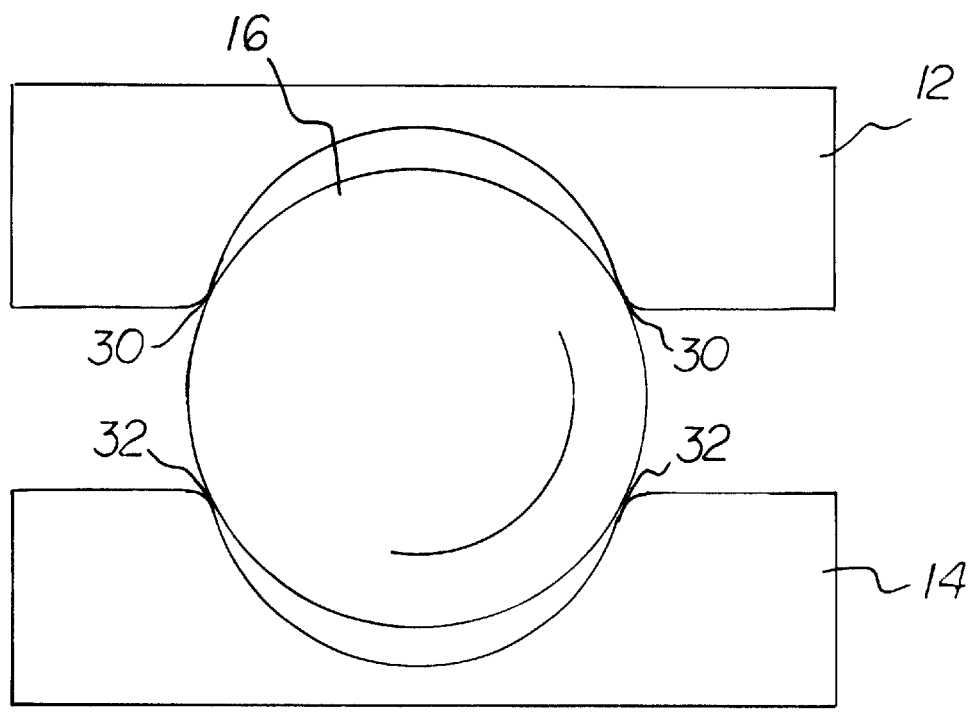
FIG. 4 illustrates another form of the inventive ball bearing assembly with different point contact position.

FIG. 4 shows a further embodiment in which the contact points 30, 32 are located at a larger diameter point on the bearings 16. While the bearing assembly 10 in an unloaded condition shows a four-point contact arrangement, in actual practice, it is unlikely that such contact will continually exist. Typically, some form of axial pre-loading will be applied to the inner race 14 such as by loading of the shaft 15 of FIG. 1. Such loading will create a single point contact in the inner race groove 22 while seating bearing 16 into groove 20. Thus, the bearing will typically operate in a three-point contact mode. Of course, if there is axial oscillation of the shaft 15, the point contact will shift with the oscillation but will seldom result in four-point contact.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A non-metallic high temperature ball bearing assembly comprising:

a plurality of spherical ball bearings of uniform radius, the ball bearing being completely formed of a ceramic material;

an outer race formed completely from a ceramic material and having a ball receiving groove formed therein, said groove being arcuate and having a radius greater than the radius of the ball bearings such that each ball bearing contacts the outer race at no more than two points, with the two points being positioned such that a plane intersecting the two points is parallel with an axis of the bearing assembly; and an inner race formed completely from a ceramic material and having a ball receiving groove formed therein, said groove being arcuate and having a radius greater than the radius of the ball bearings such that each ball bearing contacts the inner race at no more than two points, with the two points being positioned such that a plane intersecting the two points is parallel with an axis of the bearing assembly.

2. The ball bearing assembly of claim 1 wherein said inner and outer races are closed cylindrical races.

3. The ball bearing assembly of claim 2 wherein said grooves have a depth less than one-half a diameter of each ball bearing.

4. The ball bearing assembly of claim 3 wherein at least one of said inner and said outer race is split about an approximate center line of the race.

5. The ball bearing assembly of claim 3 and including a metallic outer race housing circumscribing said outer race.

6. The ball bearing assembly of claim 3 wherein the ball bearings and the inner and outer races are formed of a ceramic material selected from the group comprising silicon nitride, alumina, and zirconia.

7. The ball bearing assembly of claim 1 wherein said grooves in said inner and outer races are V-shaped to assure point-contact with the ball bearings.

8. The ball bearing of claim 1 wherein said grooves in said inner and outer races are conically shaped.

9. The ball bearing assembly of claim 1 wherein said grooves are circular in cross-section and have a radius greater than the radius of each ball bearing.

10. A non-metallic high temperature ball bearing assembly comprising:

a plurality of spherical ceramic ball bearings of uniform radius;

a ceramic outer race having a ball receiving groove formed therein, said groove having a dimension such that each ball bearing contacts the outer race at no more than two points;

a ceramic inner race having a ball receiving groove formed therein, said groove having a dimension such that each ball bearing contacts the inner race at no more than two points; and at least one of said inner and outer races being subjected to an axially directed pre-loading such that said pre-loaded race assumes single point contact with each ball bearing whereby each bearing contacts said inner and outer races at only three points.

* * * * *